(12) United States Patent
Morris et al.

(10) Patent No.: US 8,356,249 B2
(45) Date of Patent: Jan. 15, 2013

(54) INTELLIGENT VIDEO TOURS

(75) Inventors: Stephen Jeffrey Morris, Harvard, MA (US); David Emmanuel Bartolini, Charlton, MA (US); Victoria Diane Staubly, Manassas, VA (US)

(73) Assignee: Vidsys, Inc., Vienna, VA (US)

( * ) Notice: Subject to any disclaimer, the term of this patent is extended or adjusted under 35 U.S.C. 154(b) by 731 days.

(21) Appl. No.: 12/125,124

(22) Filed: May 22, 2008

(65) Prior Publication Data
US 2008/0294990 A1 Nov. 27, 2008

Related U.S. Application Data

(60) Provisional application No. 60/939,517, filed on May 22, 2007, provisional application No. 60/939,503, filed on May 22, 2007, provisional application No. 60/939,521, filed on May 22, 2007, provisional application No. 60/939,528, filed on May 22, 2007.

(51) Int. Cl.
*G01C 21/36* (2006.01)
(52) U.S. Cl. ........ 715/719; 715/756
(58) Field of Classification Search ........ 715/719, 715/756
See application file for complete search history.

(56) References Cited

U.S. PATENT DOCUMENTS

| | | | |
|---|---|---|---|
| 5,745,126 A * | 4/1998 | Jain et al. .......... | 382/154 |
| 5,875,305 A | 2/1999 | Winter et al. | |
| 6,950,789 B2 * | 9/2005 | Laird et al. .......... | 703/8 |
| 7,664,292 B2 * | 2/2010 | van den Bergen et al. ... | 382/103 |
| 2003/0014180 A1 * | 1/2003 | Myr .............. | 701/117 |
| 2004/0012600 A1 * | 1/2004 | Deering et al. ........ | 345/506 |
| 2004/0125877 A1 | 7/2004 | Chang et al. | |
| 2005/0163346 A1 * | 7/2005 | van den Bergen et al. ... | 382/103 |
| 2005/0207622 A1 | 9/2005 | Haupt et al. | |
| 2006/0161335 A1 * | 7/2006 | Beinhaker ........ | 701/200 |
| 2008/0101231 A1 * | 5/2008 | Lai et al. .......... | 370/235 |
| 2012/0150425 A1 * | 6/2012 | Chapman et al. ....... | 701/119 |

OTHER PUBLICATIONS

International Search Report mailed Nov. 24, 2008 in counterpart International Application No. ] PCT/US2008/064582.

* cited by examiner

*Primary Examiner* — Omar Abdul-Ali
*Assistant Examiner* — Haimei Jiang
(74) *Attorney, Agent, or Firm* — Chapin IP Law, LLC (57) ABSTRACT

Intelligently crafting a dynamic video tour using a plurality of video devices selected in real time is provided. A list of attributes is received, the list of attributes describing at least one characteristic of a video device. A list of factors is continuously received, the list of factors describing one or more events, an event occurring at a point in time. A subset of the plurality of video devices is selected, based upon the received list of attributes and the received list of factors. The subset changes over time due to one or more changes in the list of factors. Video is displayed from the selected subset of the plurality of video devices as a tour, the displayed video changing over time as the selected subset changes over time.

27 Claims, 6 Drawing Sheets

FIG. 1

201 RECEIVE A LIST OF ATTRIBUTES, THE LIST OF ATTRIBUTES DESCRIBING AT LEAST ONE CHARACTERISTIC OF A VIDEO DEVICE

202 CONTINUOUSLY RECEIVE A LIST OF FACTORS, THE LIST OF FACTORS DESCRIBING ONE OR MORE EVENTS, AN EVENT OCCURRING AT A POINT IN TIME

203 SELECT A SUBSET OF THE PLURALITY OF VIDEO DEVICES BASED UPON THE RECEIVED LIST OF ATTRIBUTES AND THE RECEIVED LIST OF FACTORS, WHEREIN THE SUBSET CHANGES OVER TIME DUE TO ONE OR MORE CHANGES IN THE LIST OF FACTORS

204 DISPLAY VIDEO FROM THE SELECTED SUBSET OF THE PLURALITY OF VIDEO DEVICES AS A TOUR, THE DISPLAYED VIDEO CHANGING OVER TIME AS THE SELECTED SUBSET CHANGES OVER TIME

205 PRIOR TO SELECTING, ASSIGN A WEIGHT TO ONE OR MORE FACTORS IN THE LIST OF FACTORS, AN ASSIGNED WEIGHT CORRESPONDING TO THE EVENT DESCRIBED BY THAT FACTOR

206 SELECT A SUBSET OF THE PLURALITY OF VIDEO DEVICES BASED UPON THE RECEIVED LIST OF ATTRIBUTES AND THE RECEIVED LIST OF FACTORS, WHEREIN THE SUBSET CHANGES OVER TIME DUE TO ONE OR MORE CHANGES IN THE LIST OF FACTORS, AND WHEREIN WEIGHTS ASSIGNED TO FACTORS IN THE LIST OF FACTORS INFLUENCE THE SELECTION OF VIDEO DEVICES INCLUDED IN THE SUBSET OF THE PLURALITY OF VIDEO DEVICES

FIG. 2

301 RECEIVE A LIST OF ATTRIBUTES, THE LIST OF ATTRIBUTES DESCRIBING AT LEAST ONE CHARACTERISTIC OF A VIDEO DEVICE

302 CONTINUOUSLY RECEIVE A LIST OF FACTORS, THE LIST OF FACTORS DESCRIBING ONE OR MORE EVENTS, AN EVENT OCCURRING AT A POINT IN TIME

305 RECEIVE A FIRST LIST OF FACTORS, THE FIRST LIST OF FACTORS DESCRIBING A FIRST SET OF EVENTS, AN EVENT IN THE FIRST SET OF EVENTS OCCURRING AT A POINT IN TIME

303 SELECT A SUBSET OF THE PLURALITY OF VIDEO DEVICES BASED UPON THE RECEIVED LIST OF ATTRIBUTES AND THE RECEIVED LIST OF FACTORS, WHEREIN THE SUBSET CHANGES OVER TIME DUE TO ONE OR MORE CHANGES IN THE LIST OF FACTORS

306 SELECT A SUBSET OF THE PLURALITY OF VIDEO DEVICES BASED UPON THE RECEIVED LIST OF ATTRIBUTES AND THE RECEIVED FIRST LIST OF FACTORS

304 DISPLAY VIDEO FROM THE SELECTED SUBSET OF THE PLURALITY OF VIDEO DEVICES AS A TOUR, THE DISPLAYED VIDEO CHANGING OVER TIME AS THE SELECTED SUBSET CHANGES OVER TIME

307 RECEIVE EVENT DATA, THE EVENT DATA DESCRIBING AN OCCURRENCE OF ONE OR MORE EVENTS

310 RECEIVE EVENT DATA, THE EVENT DATA DESCRIBING AN OCCURRENCE OF ONE OR MORE EVENTS

311 ASSIGN A WEIGHT TO ONE OR MORE ITEMS OF RECEIVED EVENT DATA, AN ASSIGNED WEIGHT CORRESPONDING TO THE EVENT DESCRIBED BY THAT ITEM OF RECEIVED EVENT DATA

308 CREATE A SECOND LIST OF FACTORS BASED ON THE FIRST LIST OF FACTORS AND THE RECEIVED EVENT DATA, THE SECOND LIST OF FACTORS DESCRIBING A SECOND SET OF EVENTS, THE SECOND SET OF EVENTS INCLUDES ONE OR MORE EVENTS DESCRIBED BY THE RECEIVED EVENT DATA

309 SELECT A SUBSET OF THE PLURALITY OF VIDEO DEVICES BASED UPON THE RECEIVED LIST OF ATTRIBUTES AND THE CREATED SECOND LIST OF FACTORS

312 SELECT A SUBSET OF THE PLURALITY OF VIDEO DEVICES BASED UPON THE RECEIVED LIST OF ATTRIBUTES AND THE CREATED SECOND LIST OF FACTORS, WHEREIN WEIGHTS ASSIGNED TO EVENTS DESCRIBED BY THE SECOND LIST OF FACTORS INFLUENCE THE SELECTION OF VIDEO DEVICES INCLUDED IN THE SUBSET OF THE PLURALITY OF VIDEO DEVICES

FIG. 3

401 RECEIVE A LIST OF ATTRIBUTES, THE LIST OF ATTRIBUTES DESCRIBING AT LEAST ONE CHARACTERISTIC OF A VIDEO DEVICE

405 RECEIVE A LIST OF ATTRIBUTES, THE LIST OF ATTRIBUTES INCLUDING ONE OR MORE LOCATIONS OF A VIDEO DEVICE, A LOCATION DESCRIBING AN AREA OF INTEREST TO BE INCLUDED IN A TOUR

402 CONTINUOUSLY RECEIVE A LIST OF FACTORS, THE LIST OF FACTORS DESCRIBING ONE OR MORE EVENTS, AN EVENT OCCURRING AT A POINT IN TIME

403 SELECT A SUBSET OF THE PLURALITY OF VIDEO DEVICES BASED UPON THE RECEIVED LIST OF ATTRIBUTES AND THE RECEIVED LIST OF FACTORS, WHEREIN THE SUBSET CHANGES OVER TIME DUE TO ONE OR MORE CHANGES IN THE LIST OF FACTORS

406 SELECT A SUBSET OF THE PLURALITY OF VIDEO DEVICES BASED UPON THE LOCATIONS INCLUDED IN THE RECEIVED LIST OF ATTRIBUTES AND THE RECEIVED LIST OF FACTORS, WHEREIN THE SUBSET CHANGES OVER TIME DUE TO ONE OR MORE CHANGES IN THE LOCATIONS INCLUDED IN THE LIST OF ATTRIBUTES

404 DISPLAY VIDEO FROM THE SELECTED SUBSET OF THE PLURALITY OF VIDEO DEVICES AS A TOUR, THE DISPLAYED VIDEO CHANGING OVER TIME AS THE SELECTED SUBSET CHANGES OVER TIME

FIG. 4

501 RECEIVE A LIST OF ATTRIBUTES, THE LIST OF ATTRIBUTES DESCRIBING AT LEAST ONE CHARACTERISTIC OF A VIDEO DEVICE

502 CONTINUOUSLY RECEIVE A LIST OF FACTORS, THE LIST OF FACTORS DESCRIBING ONE OR MORE EVENTS, AN EVENT OCCURRING AT A POINT IN TIME

503 SELECT A SUBSET OF THE PLURALITY OF VIDEO DEVICES BASED UPON THE RECEIVED LIST OF ATTRIBUTES AND THE RECEIVED LIST OF FACTORS, WHEREIN THE SUBSET CHANGES OVER TIME DUE TO ONE OR MORE CHANGES IN THE LIST OF FACTORS

504 DISPLAY VIDEO FROM THE SELECTED SUBSET OF THE PLURALITY OF VIDEO DEVICES AS A TOUR, THE DISPLAYED VIDEO CHANGING OVER TIME AS THE SELECTED SUBSET CHANGES OVER TIME

505 DIVIDE THE SELECTED SUBSET OF THE PLURALITY OF VIDEO DEVICES INTO A PLURALITY OF GROUPS

506 ASSIGN, TO EACH GROUP IN THE PLURALITY OF GROUPS, A DISPLAY PRIORITY, THE DISPLAY PRIORITY INDICATING HOW OFTEN VIDEO FROM THE VIDEO DEVICES IN THAT GROUP SHOULD BE DISPLAYED

507 DISPLAY LOOPS OF VIDEO AS A TOUR, THE VIDEO IN A LOOP TAKEN FROM VIDEO DEVICES IN GROUPS ASSOCIATED WITH THAT LOOP, THE GROUPS ASSOCIATED WITH A LOOP DETERMINED ACCORDING TO THE DISPLAY PRIORITY ASSIGNED TO THOSE GROUPS, SUCH THAT A GROUP WITH A HIGHER PRIORITY IS ALWAYS INCLUDED IN EACH LOOP, AND A GROUP WITH A LOWER PRIORITY IS INCLUDED IN A NUMBER OF LOOPS LESS THAN THE TOTAL NUMBER OF LOOPS

FIG. 5

601 RECEIVE A LIST OF ATTRIBUTES, THE LIST OF ATTRIBUTES DESCRIBING AT LEAST ONE CHARACTERISTIC OF A VIDEO DEVICE

605 RECEIVE A LIST OF ATTRIBUTES, THE LIST OF ATTRIBUTES DESCRIBING VIDEO DEVICES ASSOCIATED WITH RECORDED VIDEO

602 CONTINUOUSLY RECEIVE A LIST OF FACTORS, THE LIST OF FACTORS DESCRIBING ONE OR MORE EVENTS, AN EVENT OCCURRING AT A POINT IN TIME

606 RECEIVE EVENT DATA, THE EVENT DATA DESCRIBING OCCURRENCES OF ONE OR MORE EVENTS THAT OCCURRED IN THE PAST AND WERE CAPTURED ON RECORDED VIDEO

603 SELECT A SUBSET OF THE PLURALITY OF VIDEO DEVICES BASED UPON THE RECEIVED LIST OF ATTRIBUTES AND THE RECEIVED LIST OF FACTORS, WHEREIN THE SUBSET CHANGES OVER TIME DUE TO ONE OR MORE CHANGES IN THE LIST OF FACTORS

607 SELECT A SUBSET OF THE PLURALITY OF VIDEO DEVICES BASED UPON THE RECEIVED LIST OF ATTRIBUTES AND THE RECEIVED EVENT DATA, WHEREIN THE SUBSET CHANGES OVER TIME DUE TO ONE OR MORE CHANGES IN THE LIST OF ATTRIBUTES OR IN THE RECEIVED EVENT DATA

604 DISPLAY VIDEO FROM THE SELECTED SUBSET OF THE PLURALITY OF VIDEO DEVICES AS A TOUR, THE DISPLAYED VIDEO CHANGING OVER TIME AS THE SELECTED SUBSET CHANGES OVER TIME

608 DISPLAY RECORDED VIDEO FROM THE SELECTED SUBSET OF THE PLURALITY OF VIDEO DEVICES AS A TOUR, EACH ITEM OF RECORDED VIDEO IN THE TOUR BEGINNING AT A FIRST POINT IN TIME PRIOR TO THE OCCURRENCE OF AN EVENT CAPTURED ON THAT RECORDED VIDEO AND ENDING AT A SECOND POINT IN TIME AFTER THE OCCURRENCE OF THE CAPTURED EVENT

FIG. 6

//INTELLIGENT VIDEO TOURS

PRIORITY TO EARLIER FILED PROVISIONAL PATENT APPLICATIONS

This application claims the benefit of the filing date of the following earlier filed U.S. Provisional Patent Application Ser. No. 60/939,517, entitled "METHOD AND APPARATUS FOR EVENT CAPTURE, CROSS DEVICE EVENT CORRELATION, AND RESPONSIVE ACTIONS", filed on May 22, 2007; Ser. No. 60/939,503, entitled "METHOD AND APPARATUS FOR TRACKING PEOPLE AND OBJECTS USING MULTIPLE LIVE AND RECORDED SURVEILLANCE CAMERA VIDEO FEEDS", also filed on May 22, 2007; Ser. No. 60/939,521 entitled "METHOD AND APPARATUS FOR INTELLIGENT VIDEO TOURS", also filed on May 22, 2007; and Ser. No. 60/939,528, entitled "METHOD AND APPARATUS FOR OPTIMAL ROUTING OF AUDIO & VIDEO SIGNALS THROUGH HETEROGENEOUS NETWORKS", also filed on May 22, 2007. These all share co-inventorship with the present application. The entire teachings and contents of these Provisional Patent Applications are hereby incorporated by reference herein in their entirety.

BACKGROUND

Securing an area from threats, both internal to the facility and external to it, has long been a desire of those who have something of value that may be desirable to others located within the area. Early conventional security mechanisms involved placing guards at points of entry to an area to be secured. Locks of differing strengths may also have been deployed on points of entry to the area, if the area was surrounded by walls or gates. With increasing sophistication in technology, guards were also deployed within areas (i.e., inside buildings) to patrol, and badge readers and other electronic entry devices were used to supplement locks.

Guards, however, are expensive to pay, and also capable of error. Particularly for larger facilities/facilities with many possible points of entry, it may not be possible to hire enough guards to "watch" everything going on. Thus, automated devices such as security cameras have also been added to the mix of security measures. The addition of security cameras meant that security personnel could "see" all of the interesting areas of the facility (i.e., points of entry, locations were things of valued were stored, etc.). However, an increase in the number of cameras placed into a facility made it harder to watch all of the cameras simultaneously without hiring more personnel to watch the cameras. Doing so would remove the primary monetary advantage of using cameras, that is, not having to employ more personnel.

One conventional solution to the "too many cameras" problem is for security personnel to pay particular attention to a subset of all the available cameras. In this scenario, the question becomes which cameras to watch, and which cameras to ignore. Typically, the areas of high value and high risk (e.g., a vault, primary entry and exit points such as the doors going in/out of a building, etc.) are given primary focus, and other areas of lesser value and/or risk are given secondary focus. These measures have served as an adequate defense against "low tech" threats (i.e., breaking and entering by common criminals).

SUMMARY

Conventional security mechanisms such as those explained above suffer from a variety of deficiencies. Instead of continuously walking around a facility or other area, security personnel may instead watch loops of video from cameras spread around the facility. Video from cameras or other video devices may be placed in a so-called static video tour, which is then displayed to security personnel. A static video tour is a predefined list of video devices, arranged in a particular order, where video from the first video device is shown first, video from the second video device is shown second, and so on until video has been shown from every device on the list. At the end of the list, the video cycles back to the beginning of the list, and this process repeats itself. While a static video tour removes the need for security personnel to constantly walk or otherwise patrol a facility, the tour does not allow for situations that may arise at any time. For example, a tour including twenty cameras, where the twelfth camera shows video of an exterior window, will always show that video at the same interval of time in the static tour. If, immediately after the tour goes to the thirteenth camera, an intruder breaks the window and enters the building, security personnel will not see the broken glass or other signs of entry until the tour cycles back through the other eighteen cameras. By that time, an intruder may have already created a problem and left the facility through the window.

Embodiments disclosed herein provide for creating one or more dynamic video tours that overcome the above-described and other deficiencies in conventional static video tours. Video from video devices on a dynamic video tour does not come from a predefined list. Rather, the list of cameras/video devices is built on-the-fly, dynamically, from a list of all possible devices, based on a set of attributes. An attribute may describe details that are unchanging about one or more video devices, such as location, or an 'owner' of a device. Thus, for example, a dynamic video tour of the southeast section of building five would be possible by appropriately specifying the location of the video devices as attributes, as would a tour of that same section, but qualified by video devices marked as "secure".

A dynamic video tour may be qualified by other factors as well that are less related to a video device and more related to things going on in the facility being watched. For example, devices that are near areas that are considered high priority areas (e.g., a bank vault) may be selected for a dynamic video tour. Alternatively, devices that are near doors that open frequently, or doors that have previously been entered by intruders, may be selected for a dynamic video tour. The point is that the selection of video devices may be based on events, either current or past, and may also be weighted appropriately, and the cameras selected from that list may not be the same this time that the dynamic tour is viewed versus the next time; i.e. it may change based on events and changing circumstances, as well as simply changing based on time of day, and day of week.

More particularly, in an embodiment, there is provided a method of intelligently crafting a dynamic video tour using a plurality of video devices selected in real time. The method includes receiving a list of attributes, the list of attributes describing at least one characteristic of a video device, and continuously receiving a list of factors, the list of factors describing one or more events, an event occurring at a point in time. The method also includes selecting a subset of the plurality of video devices based upon the received list of attributes and the received list of factors, wherein the subset changes over time due to one or more changes in the list of factors, and displaying video from the selected subset of the plurality of video devices as a tour, the displayed video changing over time as the selected subset changes over time.

In a related embodiment, continuously receiving a list of factors may include receiving a first list of factors, the first list of factors describing a first set of events, an event in the first set of events occurring at a point in time; and selecting may include selecting a subset of the plurality of video devices based upon the received list of attributes and the received first list of factors; and the method may include receiving event data, the event data describing an occurrence of one or more events; creating a second list of factors based on the first list of factors and the received event data, the second list of factors describing a second set of events, the second set of events includes one or more events described by the received event data; and selecting a subset of the plurality of video devices based upon the received list of attributes and the created second list of factors. In a further related embodiment, receiving event data may include receiving event data, the event data describing an occurrence of one or more events; and assigning a weight to one or more items of received event data, an assigned weight corresponding to the event described by that item of received event data; and selecting may include selecting a subset of the plurality of video devices based upon the received list of attributes and the created second list of factors, wherein weights assigned to events described by the second list of factors influence the selection of video devices included in the subset of the plurality of video devices.

In another related embodiment, the method may include prior to selecting, assigning a weight to one or more factors in the list of factors, an assigned weight corresponding to the event described by that factor; and selecting may include selecting a subset of the plurality of video devices based upon the received list of attributes and the received list of factors, wherein the subset changes over time due to one or more changes in the list of factors, and wherein weights assigned to factors in the list of factors influence the selection of video devices included in the subset of the plurality of video devices.

In yet another related embodiment, receiving a list of attributes may include receiving a list of attributes, the list of attributes including one or more locations of a video device, a location describing an area of interest to be included in a tour; and selecting may include selecting a subset of the plurality of video devices based upon the locations included in the received list of attributes and the received list of factors, wherein the subset changes over time due to one or more changes in the locations included in the list of attributes.

In still yet another related embodiment, displaying may include dividing the selected subset of the plurality of video devices into a plurality of groups; assigning, to each group in the plurality of groups, a display priority, the display priority indicating how often video from the video devices in that group should be displayed; and displaying loops of video as a tour, the video in a loop taken from video devices in groups associated with that loop, the groups associated with a loop determined according to the display priority assigned to those groups, such that a group with a higher priority is always included in each loop, and a group with a lower priority is included in a number of loops less than the total number of loops.

In yet still another related embodiment, receiving a list of attributes may include receiving a list of attributes, the list of attributes describing video devices associated with recorded video; and continuously receiving a list of factors may include receiving event data, the event data describing occurrences of one or more events that occurred in the past and were captured on recorded video; and selecting may include selecting a subset of the plurality of video devices based upon the received list of attributes and the received event data, wherein the subset changes over time due to one or more changes in the list of attributes or in the received event data; and displaying may include displaying recorded video from the selected subset of the plurality of video devices as a tour, each item of recorded video in the tour beginning at a first point in time prior to the occurrence of an event captured on that recorded video and ending at a second point in time after the occurrence of the captured event.

In another embodiment, there is provided a computer program product, stored on computer readable medium, for intelligently crafting a dynamic video tour using a plurality of video devices selected in real time. The computer program product includes computer program code for receiving a list of attributes, the list of attributes describing at least one characteristic of a video device; computer program code for continuously receiving a list of factors, the list of factors describing one or more events, an event occurring at a point in time; computer program code for selecting a subset of the plurality of video devices based upon the received list of attributes and the received list of factors, wherein the subset changes over time due to one or more changes in the list of factors; and computer program code for displaying video from the selected subset of the plurality of video devices as a tour, the displayed video changing over time as the selected subset changes over time.

In another embodiment, there is provided a computer system. The computer system includes a memory; a processor; a network interface; a display; and an interconnection mechanism coupling the memory, the processor, the display, and the network interface, allowing communication there between. The memory of the computer system is encoded with a dynamic touring application, that when executed in the processor, provides a dynamic touring process that intelligently crafts a dynamic video tour using a plurality of video devices selected in real time, by causing the computer system to perform operations of: receiving a list of attributes, the list of attributes describing at least one characteristic of a video device; continuously receiving a list of factors, the list of factors describing one or more events, an event occurring at a point in time; selecting a subset of the plurality of video devices based upon the received list of attributes and the received list of factors, wherein the subset changes over time due to one or more changes in the list of factors; and displaying video from the selected subset of the plurality of video devices as a tour, the displayed video changing over time as the selected subset changes over time.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing client management of download sequence of orchestrated content as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as but not limited to an optical medium (e.g., CD-ROM, DVD-ROM, etc.), floppy or hard disk, a so-called "flash" (i.e., solid state) memory medium, or other physical medium, such as but not limited to firmware or microcode in one or more ROM or RAM or PROM chips, or as an Application Specific Integrated Circuit (ASIC), or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities may also provide the system of the invention. The system of the invention may be distributed between many software processes on several data communications devices, or all processes may run on a small set of dedicated computers, or on one computer alone.

It is to be understood that embodiments of the invention may be embodied strictly as a software program, as software and hardware, or as hardware and/or circuitry alone. The features disclosed and explained herein may be employed in computerized devices and software systems for such devices such as those manufactured by Vidsys, Inc. of Marlborough, Mass.

BRIEF DESCRIPTION OF THE DRAWINGS

The foregoing will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

FIG. 3 illustrates a flowchart of a procedure performed by the system of FIG. 1 when creating a dynamic video tour using event data.

DETAILED DESCRIPTION

Generally, disclosed embodiments provide methods and apparatus for intelligently crafting a dynamic video tour using information received from external sources that causes a set of video devices displaying the video of the tour to change over time. A dynamic video tour thus includes video from video devices selected a list of all possible video devices, based on a list of attributes and a set of factors. Attributes may describe details that are unchanging about video devices. Factors are less related to the devices and are more related to things going on in the local (i.e., events), either current or past. Further, factors may be weighted based on data about events, or in other ways. Embodiments select video devices to provide video for the dynamic tour on the fly, and in some embodiments, the ordering of devices in the tour is also determined on the fly; in both cases, changes in attributes, factors, and the like over time, based on changes in the area being watched via tour, may also result in corresponding changes in the dynamic tour.

Figure 1:
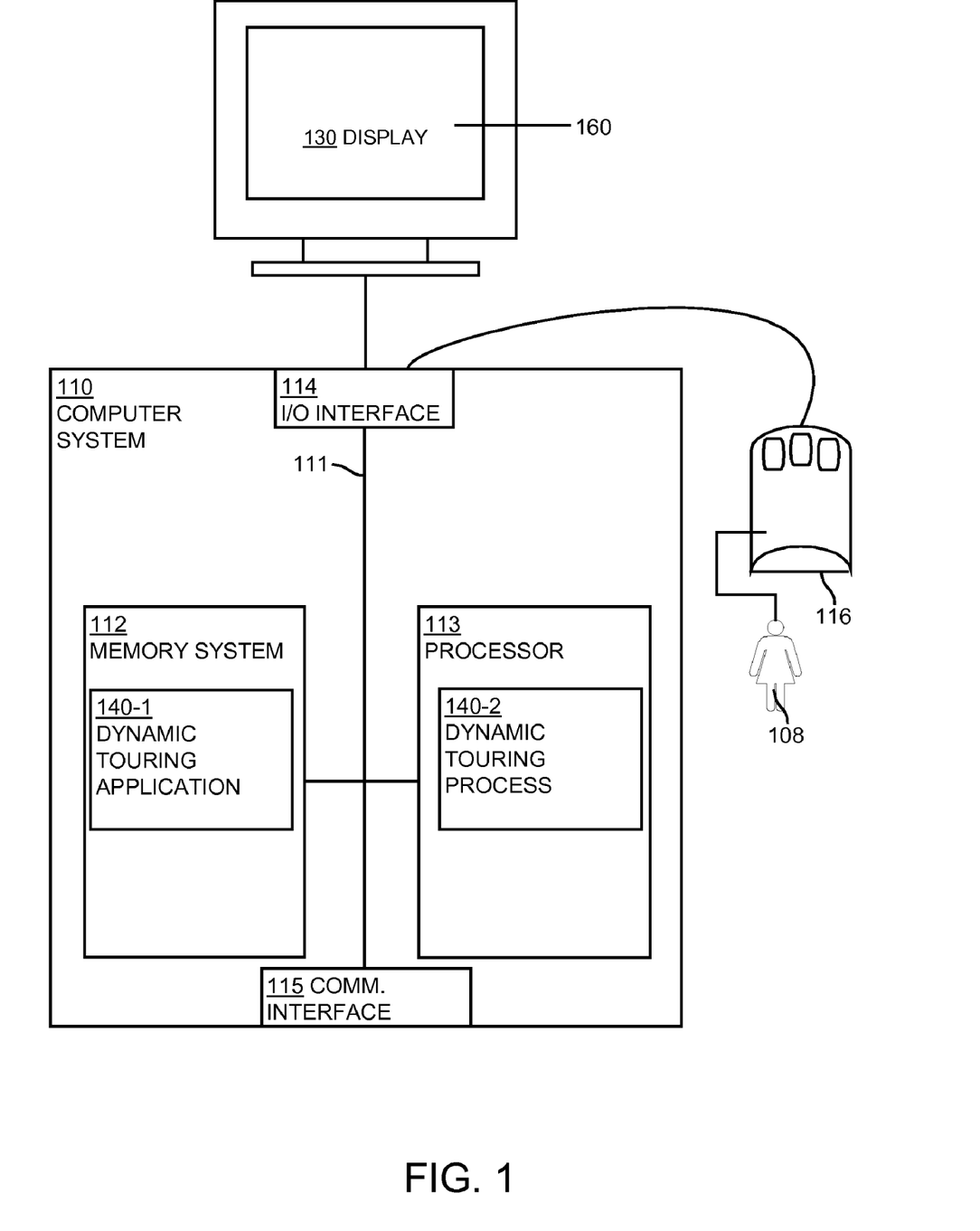
FIG. 1 shows a high-level block diagram of a computer system according to one embodiment disclosed herein.

More particularly, FIG. 1 is a block diagram illustrating example architecture of a computer system 110 that executes, runs, interprets, operates or otherwise performs a dynamic touring application 140-1 and a dynamic touring process 140-2 suitable for use in explaining example configurations disclosed herein. The computer system 110 may be any type of computerized device such as a personal computer, workstation, portable computing device, console, laptop, network terminal or the like. As shown in this example, the computer system 110 includes an interconnection mechanism 111 such as a data bus or other circuitry that couples a memory system 112, a processor 113, an input/output interface 114, and a communications interface 115. An input device 116 (e.g., one or more user controlled devices such as a keyboard, mouse, touchpad, trackball, etc.) couples to the processor 113 through the I/O interface 114 and enables a user 108 such as a web page developer to provide input commands and generally control a graphical user interface 160 shown on a display 130. The communications interface 115 enables the computer system 110 to communicate with other devices (e.g., other computers) on a network (not shown in FIG. 1).

The memory system 112 is any type of computer readable medium and in this example is encoded with a dynamic touring application 140-1. The dynamic touring application 140-1 may be embodied as software code such as data and/or logic instructions (e.g., code stored in the memory or on another computer readable medium such as a removable disk) that supports processing functionality according to different embodiments described herein. During operation of the computer system 110, the processor 113 accesses the memory system 112 via the interconnection mechanism 111 in order to launch, run, execute, interpret or otherwise perform the logic instructions of the dynamic touring application 140-1. Execution of the dynamic touring application 140-1 in this manner produces processing functionality in a dynamic touring process 140-2. In other words, the dynamic touring process 140-2 represents one or more portions or runtime instances of the dynamic touring application 140-1 performing or executing within or upon the processor 113 in the computer system 110 at runtime.

It is noted that example configurations disclosed herein include the dynamic touring application 140-1 itself including the dynamic touring process 140-2 (i.e., in the form of un-executed or non-performing logic instructions and/or data). The dynamic touring application 140-1 may be stored on a computer readable medium (such as a floppy disk), hard disk, electronic, magnetic, optical or other computer readable medium. The dynamic touring application 140-1 may also be stored in a memory system 112 such as in firmware, read only memory (ROM), or, as in this example, as executable code in, for example, Random Access Memory (RAM). In addition to these embodiments, it should also be noted that other embodiments herein include the execution of the dynamic touring application 140-1 in the processor 113 as the dynamic touring process 140-2. Those skilled in the art will understand that the computer system 110 may include other processes and/or software and hardware components, such as an operating system not shown in this example.

The display 130 need not be coupled directly to computer system 110. For example, the dynamic touring application 140-1 may be executed on a remotely accessible computerized device via the network interface 115. In this instance, the graphical user interface 160 may be displayed locally to a user of the remote computer and execution of the processing herein may be client-server based. In some embodiments, the graphical user interface 160 may be a customer interface through which a user, such as the user 108, is able to learn various information and take various actions. The amount of features, and control thereof, may depend on a user level, such that a basic user has access to only a certain amount of features, while an administrator may have access to all available features. Key features of the graphical user interface 160 may include the ability to locate and activate cameras easily from a searchable directory; the ability to locate and activate cameras easily from a map representation; the ability to control Cameras and NDVRs to effect Pan-Tilt-Zoom (PTZ), Iris, Focus, Playback, etc.; the ability to list and get details on incoming events; the ability to locate people and use collaboration tools to interact with them; the ability to locate shared folders and reference and active files; the ability to control video walls; the ability to virtually track one or more targets over time, which are described in detail in co-pending U.S. patent application Ser. No. 12/125,122, entitled "TRACKING PEOPLE AND OBJECTS USING MULTIPLE LIVE AND RECORDED SURVEILLANCE CAMERA VIDEO FEEDS", the entirety of which is hereby incorporated by reference; and administrative features such as but not limited to create/modify/list/delete users, roles, tours, devices, etc.

FIGS. 2-6 are flowcharts of various embodiments of the dynamic touring process 140-2. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flowcharts do not depict the syntax of any particular programming language. Rather, the flowcharts illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and may be varied without departing from the spirit of the invention. Thus, unless otherwise stated, the steps described below are unordered, meaning that, when possible, the steps may be performed in any convenient or desirable order.

Figure 2:
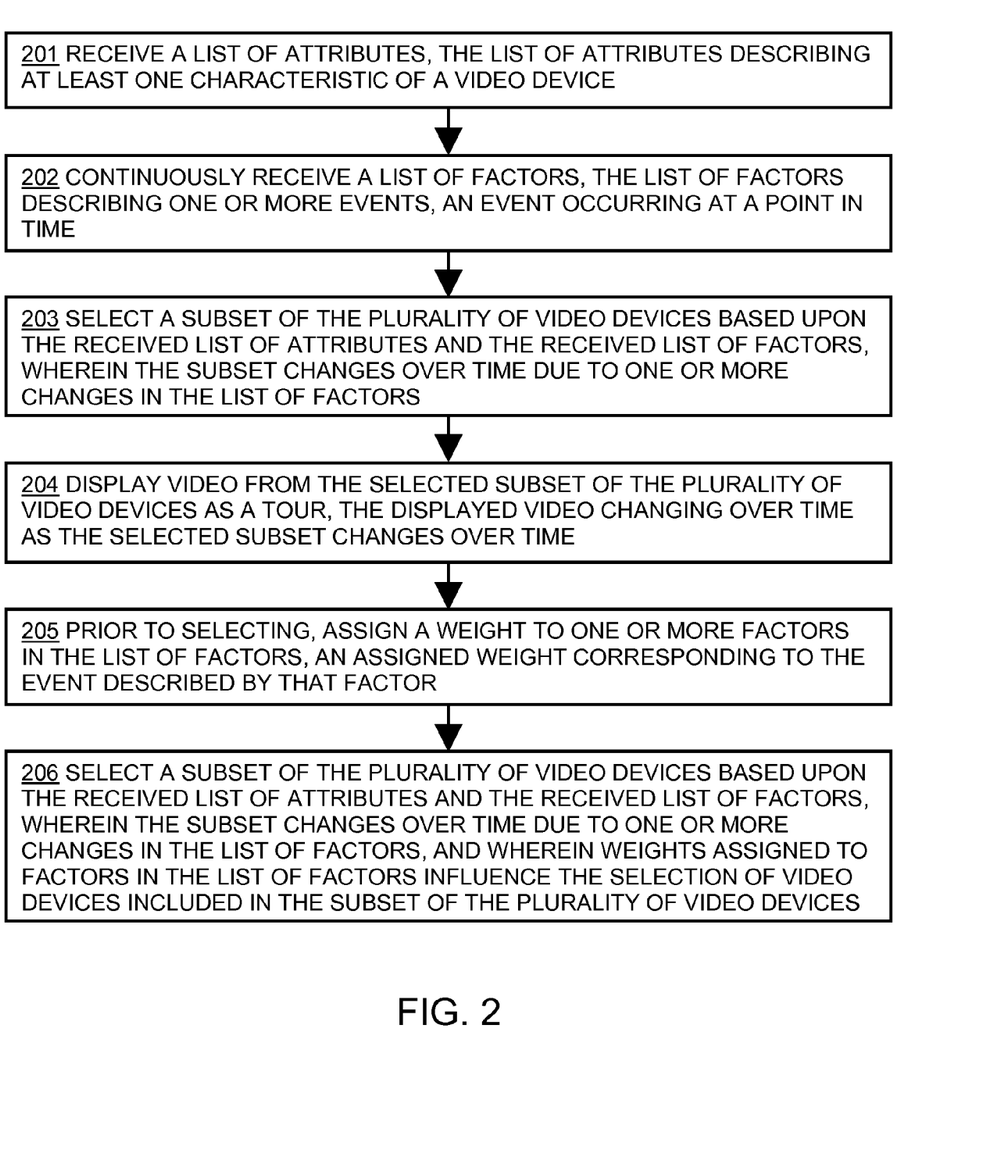
FIG. 2 illustrates a flowchart of a procedure performed by the system of FIG. 1 when creating a dynamic video tour based on one or more attributes of video devices and one or more factors describing events.

FIG. 2 illustrates an embodiment of the dynamic touring application 140-1, executing as the dynamic touring process 140-2, to create one or more dynamic video tours as described herein. The dynamic touring process 140-2 crafts a dynamic video tour using a plurality of video devices selected in real time. The dynamic touring process 140-2 first receives a list of attributes, the list of attributes describing at least one characteristic of a video device, step 201. That is, an attribute might be, for example, a location of a video device, or an area at which the video device points, or a preset setting of a video device, and so on. In the case of location, receiving the location allows a user to view a video tour that shows a specific area, such as all the entryways of a building, or a more general location, such as a sampling of all the floors of a building, or all the buildings in a facility. Any geographic breakdown may be used to specify location, from city blocks to political demographics, that is, precincts or wards, and so on. Further embodiments dealing with location-based attributes are described in greater detail with regards to FIG. 4 below. Note that some attributes may change over time, and in such situations, the dynamic touring process 140-2 may continuously receive a list of attributes over a period of time.

An attribute may also be the owner of a video device. For example, in the case of multiple companies having space in the same building, knowing the owner of the video devices would allow a user to create a tour of video from only those devices that belong to a particular organization.

The dynamic touring process 140-2 next continuously receives a list of factors, the list of factors describing one or more events, an event occurring at a point in time, step 202. Events may be anything that occurs and is otherwise detected, either by the dynamic touring process 140-2 itself, or by other process(es) to which the dynamic touring process 140-2 has access, or otherwise receives data from. The list of factors may also include time-based data. That is, the list of factors may identify how long an event occurred, and thus how long the dynamic touring process 140-2 should consider including the related video. In some embodiments, the list of factors includes time-based data that describes when the dynamic touring process 140-2 should show video in a tour. For example, the list of factors may include time data based on the time of day, such as but not limited to, when rush hour traffic starts and ends, when the sun sets and rises, when buildings close and open, when local events (movies, sporting events, theater productions, church services, etc.) start and end, and so on. In some embodiments, the list of factors may include time data based on the time and/or day of week, such as but not limited to traffic flows on weekdays versus weekends and/or holidays, and expected delivery and/or pickup times, as well as delivery schedules. The list of factors may also include time data based on time of year, such as holiday schedules (e.g., Christmas-season hours for businesses), holiday occurrences (Halloween, Fourth of July), and so on. In some embodiments, the list of factors may include historical-based data, such as but not limited to areas in which events have previously occurred. Thus, in some embodiments, the dynamic touring process 140-2 may employ such data to create a dynamic video tour that is predictive, that is, shows video of areas the dynamic touring process 140-2 predicts where events may occur at a later time. Further embodiments dealing with event-based factors and processing thereof are described in greater detail with regards to FIG. 3 below.

The dynamic touring process 140-2 then selects a subset of the plurality of video devices based upon the received list of attributes and the received list of factors, step 203. The subset changes over time due to one or more changes in the list of factors. For example, one of the factors on the received list of factors may be when rush hour traffic peaks (i.e., exceeds a particular threshold). That is, the dynamic touring process 140-2 is to include, as part of the tour, video of traffic at a particular intersection when rush hour traffic through that intersection exceeds a set amount. The moment(s) in time when rush hour traffic exceeds the threshold is likely to change from day to day and within days as well. Thus, the video tour created by the dynamic touring process 140-2 for that day is likely to change at least one if not many times during rush hour as traffic at the intersection exceeds the set amount. Alternatively, when one or more received attributes change over time, and the dynamic touring process 140-2 receives those changes, the selection of the subset by the dynamic touring process 140-2 may change due to attribute changes instead of factor changes. In some embodiments, the selection of the subset by the dynamic touring process 140-2 changes as a result of both attribute changes and factor changes.

Finally, the dynamic touring process 140-2 displays video from the selected subset of the plurality of video devices as a tour, the displayed video changing over time as the selected subset changes over time, step 204. That is, the dynamic touring process 140-2 takes a list of the selected subset of the plurality of video devices as well as the durations for which it is to show video from those devices. The dynamic touring process 140-2 will string those together, such as, in some embodiments, by using a connection engine, and create the tour. The dynamic touring process 140-2 is configured such that, if video is not available at any time, for any reason (e.g., errors, device(s) not available at this time, or for this user, latency of changing paths, etc.), the dynamic touring process 140-2 will not show a blank screen or spot in a tour. Also, in some embodiments, the dynamic touring process 140-2 may have a list of one or more references to device preset positions for devices in the selected subset, such that, prior to taking video from a device, the dynamic touring process 140-2 sends a command to that device to move to a particular preset. The dynamic touring process 140-2 is able to command a video device to switch between presets as needed within the same tour.

In some embodiments, the dynamic touring process 140-2, prior to selecting, assigns a weight to one or more factors in the list of factors, step 205. A weight assigned by the dynamic touring process 140-2 corresponds to the event described by that factor. The dynamic touring process 140-2 may assign weights to any video device as a way of, for example, making sure that a particular device is likely to be selected, or not be selected. That is, by assigning a particular video device a high weight, unless there is a reason to ignore the weight, this will probably cause the dynamic touring process 140-2 to select that device. The dynamic touring process 140-2 may assign a weight based on user input (i.e., user commands the dynamic touring process 140-2 to weight one or more devices according to weights provided by the user), or through interaction with other processes that assign weights to video devices/events, or in any known manner.

The dynamic touring process 140-2 then selects a subset of the plurality of video devices based upon the received list of attributes and the received list of factors, wherein the subset changes over time due to one or more changes in the list of factors, and wherein weights assigned to factors in the list of factors influence the selection of video devices included in the subset of the plurality of video devices, step 206. In other words, the dynamic touring process 140-2 may take the weight into account but the weights need not be dispositive. That is, in some embodiments, the dynamic touring process 140-2 may select a video device with a higher assigned weight over an otherwise similar video device with a lower assigned weight. However, in some embodiments, the dynamic touring process 140-2 may ignore any assigned weights and select video devices as otherwise described herein.

In FIG. 3, the dynamic touring process 140-2 uses event-based data to craft a tour. The dynamic touring process 140-2 first receives a list of attributes, the list of attributes describing at least one characteristic of a video device, step 301. The dynamic touring process 140-2 next continuously receives a list of factors, the list of factors describing one or more events, an event occurring at a point in time, step 302. More particularly, the dynamic touring process 140-2 receives a first list of factors, the first list of factors describing a first set of events, an event in the first set of events occurring at a point in time, step 305. As described above, an event is simply something that takes place and is, in some manner, recorded or otherwise noticed by a device to which the dynamic touring process 140-2 has access. Thus, for example, when a person uses a security badge at a badge reader at the door to a particular room, to enter that room, the security event data may include the id number of the badge and the location of the badge reader. The event would be using the security badge. A further event may be the opening and closing of the door, if there is a sensor on the door capable of noticing that event. The event data for such a thing would be a reading from the sensor, first indicating the opening of the door, and then indicating the shutting of the door.

The number of devices that may serve as sources of event data for the dynamic touring process 140-2 is large. In some embodiments, event data is filtered through, and received by the dynamic touring process 140-2 from, an event engine/event and rules correlating process described in detail in co-pending U.S. patent application Ser. No. 12/125,115, entitled "EVENT CAPTURE, CROSS DEVICE EVENT CORRELATION, AND RESPONSIVE ACTIONS", the entirety of which is hereby incorporated by reference. Thus, in some embodiments, the dynamic touring process 140-2 may make use of not only event data but also may create rules so as to craft a dynamic video tour. That is, a tour may be composed by having a number of video devices, in response to events, turn on and send their data to the dynamic touring process 140-2 for display.

The dynamic touring process 140-2 selects a subset of the plurality of video devices based upon the received list of attributes and the received list of factors, step 303. The subset changes over time due to one or more changes in the list of factors. Here, the dynamic touring process 140-2 selects a subset of the plurality of video devices based upon the received list of attributes and the received first list of factors, step 306. The dynamic touring process 140-2 displays video from the selected subset of the plurality of video devices as a tour, the displayed video changing over time as the selected subset changes over time, step 304.

Event data is likely to change over time. For example, a door to a vault that was shut until one second ago opens, and then shuts again ten minutes later; a sensor may detect an increase in traffic at an intersection as the day goes on; and so on. The dynamic touring process 140-2 must be able to change a tour as event data changes. Thus, while displaying a tour, the dynamic touring process 140-2 may receive event data, the event data describing an occurrence of one or more events, step 307. Event data may include, but is not limited to, a door and/or window rattling, calls made to a police dispatcher or to 911, and so on.

As the dynamic touring process 140-2 receives (further) event data, the dynamic touring process 140-2 may create a second list of factors based on the first list of factors and the received event data, the second list of factors describing a second set of events, the second set of events includes one or more events described by the received event data, step 308. Thus, for example, the second list of factors may include updates made to factors contained in the first list of factors. That is, the second list of factors may describe what traffic is like at any intersection at 4:30 PM while the first group of factors described traffic at that same intersection but at 4:00 PM. The dynamic touring process 140-2 then selects a subset of the plurality of video devices based upon the received list of attributes and the created second list of factors, step 309. The dynamic touring process 140-2 thus changes the selected subset in accordance with the changes made in the second list of factors. Of course the dynamic touring process 140-2 may repeat this process as many times as necessary, including, in some embodiments, while or after displaying video from just a single device in the original selected subset.

In some embodiments, the dynamic touring process 140-2 may combine changes in event data with time data while crafting a tour. For example, the dynamic touring process 140-2 may select video devices near locations in which an event occurred, or changed, within the last five minutes, though of course any time may be used. Such a tour as created by the dynamic touring process 140-2 essentially becomes a rolling tour as the event data comes in and time moves forward.

In some embodiments, the dynamic touring process 140-2 receives event data, the event data describing an occurrence of one or more events, step 310, and then assigns a weight to one or more items of received event data, an assigned weight corresponding to the event described by that item of received event data, step 311. The dynamic touring process 140-2 then selects a subset of the plurality of video devices based upon the received list of attributes and the created second list of factors, wherein weights assigned to events described by the second list of factors influence the selection of video devices included in the subset of the plurality of video devices, step 312.

The dynamic touring process 140-2 may assign weights in any number of ways. For example, the dynamic touring process 140-2 may assign the jiggling of a door handle a lesser weight than the breaking of a window. Further, weights may be based on duration as well as time of day. That is, the dynamic touring process 140-2 may assign weights to events such that, the same door handle being jiggled five times in a week is assigned a lesser weight than the same door handle being jiggled five times in a minute. Further, the dynamic touring process 140-2 may assign weights such that, a door handle being jiggled at noon, while the building is full of people, has a lesser weight than a door handle being jiggled at midnight, after the building has been unoccupied for hours.

In some embodiments, the dynamic touring process 140-2 may assign weights based on an increase in a value accumulator in an event accumulator, such as is described in detail in co-pending U.S. patent application Ser. No. 12/125,115, entitled "EVENT CAPTURE, CROSS DEVICE EVENT CORRELATION, AND RESPONSIVE ACTIONS", the entirety of which is hereby incorporated by reference. Thus, one or more events occur more and more, so that the value in the accumulator rises, which may cause the dynamic touring process 140-2 assigns weights to nearby video devices. Those assigned weights may themselves increase over time. The weights may cause the dynamic touring process 140-2 to always select, or more frequently select, those video devices. Alternatively, or additionally in some embodiments, the weights may be assigned based on a history or status of an area covered by the video devices.

Figure 4:
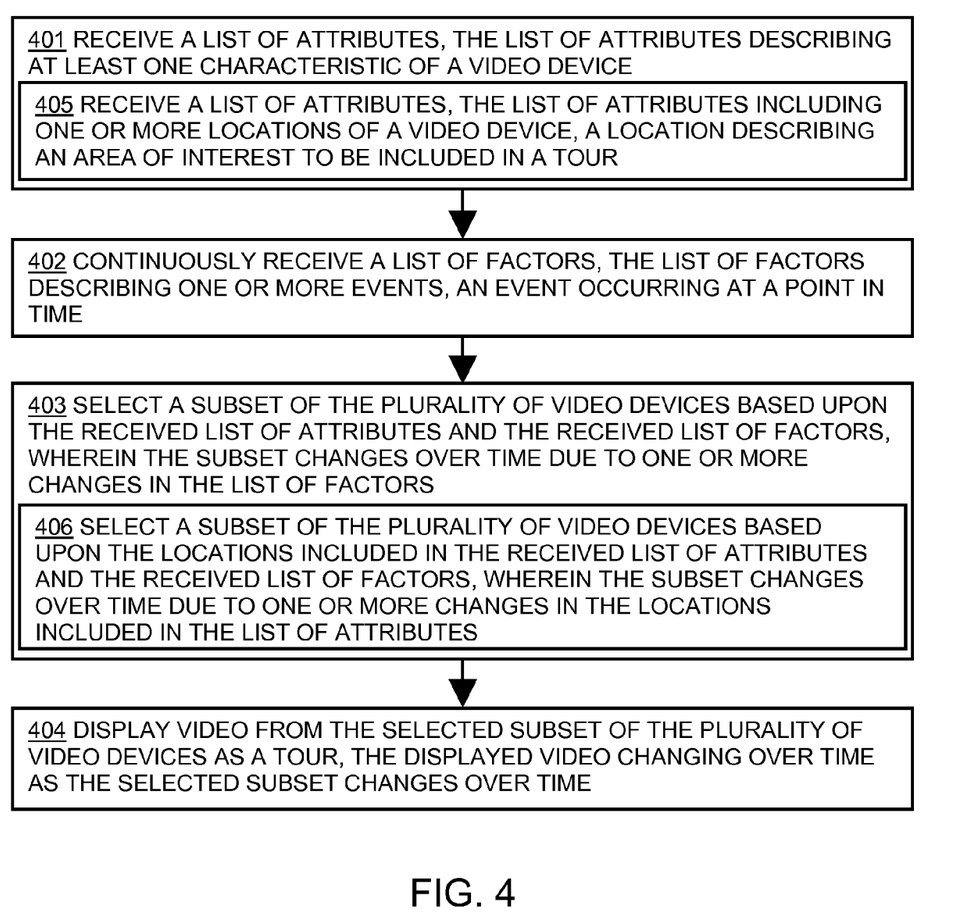
FIG. 4 illustrates a flowchart of a procedure performed by the system of FIG. 1 when creating a dynamic video tour using location data.

FIG. 4 illustrates an embodiment where the dynamic touring process 140-2 uses location-based data when creating a dynamic video tour. That is, the dynamic touring process 140-2 first receives a list of attributes, the list of attributes describing at least one characteristic of a video device, step 401, and more particularly, the dynamic touring process 140-2 receives a list of attributes, the list of attributes including one or more locations of a video device, a location describing an area of interest to be included in a tour, step 405. For example, a list of attributes may include video devices located in and around a bank vault, or outside the primary entrance gate to a walled complex. In some embodiments, the dynamic touring process 140-2 interfaces with a so-called geo engine, such as is disclosed in co-pending U.S. patent application Ser. No. 12/125,122, entitled "TRACKING PEOPLE AND OBJECTS USING MULTIPLE LIVE AND RECORDED SURVEILLANCE CAMERA VIDEO FEEDS", the entirety of which is hereby incorporated by reference. The geo engine as disclosed therein receives location-based data and makes various decisions based on that data to select one or more video devices for use in tracking a target. Here, the geo engine would instead use the received location-based data for, for example, identifying video devices that may be of use in creating a video tour. That is, using the bank vault example above, the vault may be surrounded by twelve video devices. Not all of those devices may be necessary to properly show the area surrounding the vault. The geo engine is able to use, for example, the locations of those devices and location of the vault to, as need, parse down the twelve devices into a smaller number. The geo engine would then pass along the locations of those remaining devices to the dynamic touring process 140-2. The geo engine may, in some embodiments, also use event-based data in making its determinations. For example, continuing the bank vault example, the geo engine may incorporate sensor data that shows were the most foot traffic around the vault occurs, and identify video devices that cover those areas as being of primary importance. Of course the geo engine is able to use a variety of event-based data and is also able to take video device presets into account.

The dynamic touring process 140-2 next continuously receives a list of factors, the list of factors describing one or more events, an event occurring at a point in time, step 402. The dynamic touring process 140-2 selects a subset of the plurality of video devices based upon the received list of attributes and the received list of factors, step 403. The subset changes over time due to one or more changes in the list of factors. Here, the dynamic touring process 140-2 selects a subset of the plurality of video devices based upon the locations included in the received list of attributes and the received list of factors, wherein the subset changes over time due to one or more changes in the locations included in the list of attributes. Thus, for example, in some embodiments, a user of the dynamic touring process 140-2 may wish to show the locations of all snow plows out to plow during a snowstorm. Each snowplow has a GPS (global positioning satellite) transponder and this GPS data is received by the dynamic touring process 140-2. The dynamic touring process 140-2 is able to correlate that GPS data with the locations of all available video devices, so as to identify the video devices nearest each snow plow at any given time. As the snow plows drive around, their locations will change, and thus the location(s) of the video devices nearest each snow plow will also change. The dynamic touring process 140-2 receives the changes in the locations and acts accordingly. In some embodiments, as described above, the dynamic touring process 140-2 may use another process or component, such as the geo engine, to at least assist in making decisions regarding location-based data and the video devices that should be selected based on location data.

In some embodiments, the dynamic touring process 140-2 may make us of an expected or otherwise predicted path from a tracking application in crafting a dynamic tour. For example, the dynamic touring process 140-2 may receive a predicted escape route for a vehicle looking to leave a city, as well as a last known location of the vehicle. Using the data, the dynamic touring process 140-2 would select appropriate video devices including the video device covering the last known location and video devices along the predicted path. The dynamic touring process 140-2 would then create a tour using, perhaps among other devices, these devices along the predicted path. In some embodiments, the dynamic touring process 140-2 may use multiple predicted paths, and may include devices from many such paths in a tour. Further, in some embodiments, the dynamic touring process 140-2 may interface with a tracking application that weighs the possible predicted paths in terms of most likely to be used to least likely to be used. The dynamic touring process 140-2 may then use those weights in selecting the video devices for the tour.

Finally, the dynamic touring process 140-2 displays video from the selected subset of the plurality of video devices as a tour, the displayed video changing over time as the selected subset changes over time, step 404.

Figure 5:
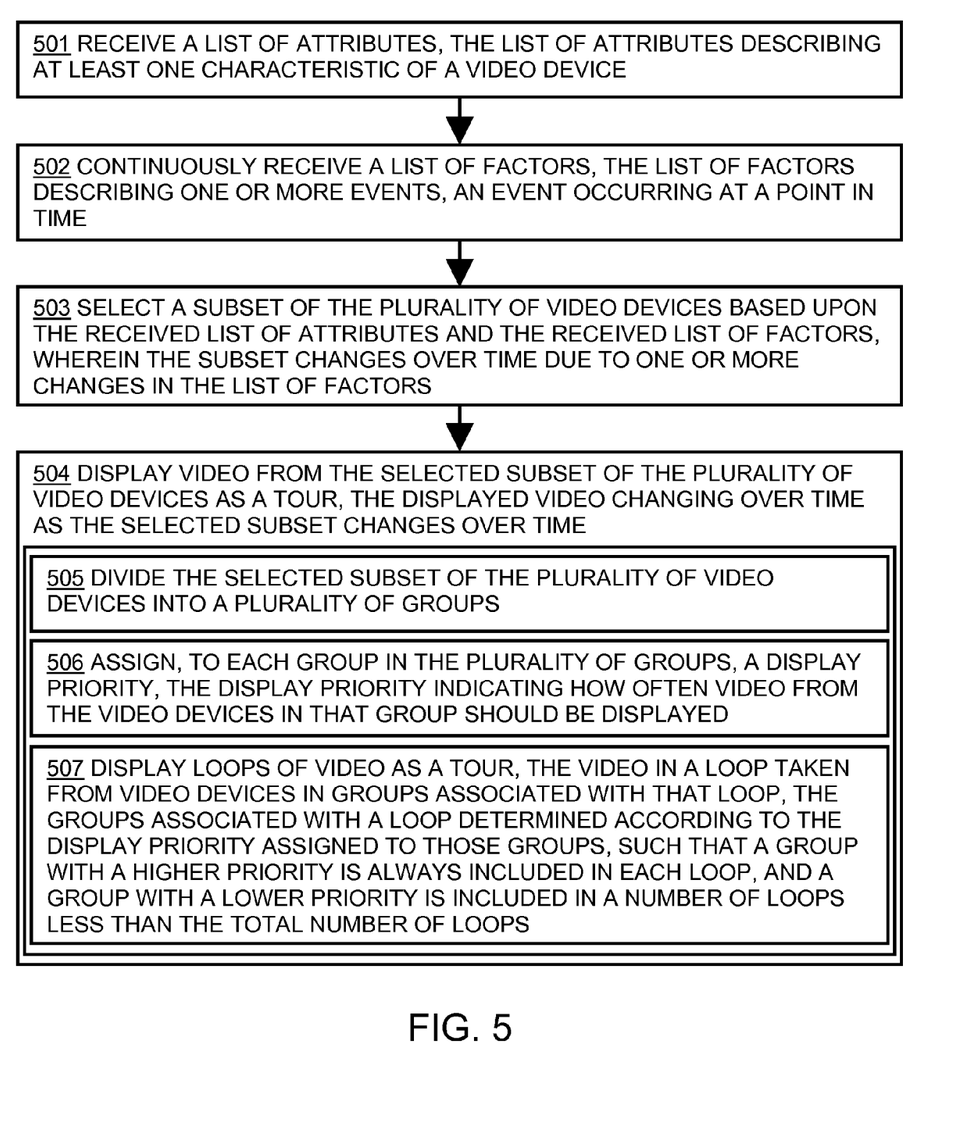
FIG. 5 illustrates a flowchart of a procedure performed by the system of FIG. 1 when looping through video from video devices in a dynamic video tour, where each loop contains video from varying devices.

In FIG. 5, the dynamic touring process 140-2 selects different groupings of video devices from which to play video for loops that comprise a dynamic tour. For example, the dynamic touring process 140-2 may always use video from a first group of video devices in each loop of a tour, while the dynamic touring process 140-2 uses video from a different part of a second group of video devices for each different loop. The dynamic touring process 140-2 first receives a list of attributes, the list of attributes describing at least one characteristic of a video device, step 501. In some embodiments, the list of attributes may include groupings of video devices. Video devices may be grouped in any number of ways. For example, a user may determine which video devices belong to a group. Alternatively, the dynamic touring process 140-2 may itself divide video devices into groups, such as is described in greater detail below.

The dynamic touring process 140-2 next continuously receives a list of factors, the list of factors describing one or more events, an event occurring at a point in time, step 502. The dynamic touring process 140-2 selects a subset of the plurality of video devices based upon the received list of attributes and the received list of factors, step 503. The subset changes over time due to one or more changes in the list of factors.

Finally, the dynamic touring process 140-2 displays video from the selected subset of the plurality of video devices as a tour, the displayed video changing over time as the selected subset changes over time, step 504. More particularly, prior to displaying video, the dynamic touring process 140-2 divides the selected subset of the plurality of video devices into a plurality of groups, step 505. The dynamic touring process 140-2 may determine which video devices belong to which group or groups in any number of ways. For example, the dynamic touring process 140-2 may use the location of video devices to determine groups. Thus, the dynamic touring process 140-2 may have location data for each video device among the received list of attributes, and the dynamic touring process 140-2 may decide that all video devices on the first floor of a building belong to a first group, that all devices on the second floor belong to a second group, and so on.

The dynamic touring process 140-2 then assigns, to each group in the plurality of groups, a display priority, the display priority indicating how often video from the video devices in that group should be displayed, step 506. Continuing the above example, say the fifth floor of the building contains a number of vaults. Vaults, of course, typically contain items of great value. The dynamic touring process 140-2, knowing about the vaults, perhaps from the received set of factors or from the received list of attributes, would assign the fifth group (containing the devices on the fifth floor) a very high display priority. A user would likely want to see that video as often as possible. At the same time, the third floor and seventh floor of the building contain no easily accessible entry points, and otherwise have nothing of value. The dynamic touring process 140-2 may assign the third group and the seventh group lower display priorities as a result. A user would likely not need to see video from both of those groups in each loop, but perhaps only one group per loop, or one group every other loop. Of course, a user could override such decisions by instructing the dynamic touring process 140-2 on how to create groups, which priority to assign to which group, or both. Thus, the dynamic touring process 140-2 may use user input, or data from the received list of attributes, or the received list of factors, or data from other sources, or combinations of all these, to both group video devices and to assign them display priority.

Finally, the dynamic touring process 140-2 displays loops of video as a tour, the video in a loop taken from video devices in groups associated with that loop, the groups associated with a loop determined according to the display priority assigned to those groups, such that a group with a higher priority is always included in each loop, and a group with a lower priority is included in a number of loops less than the total number of loops, step 507. Thus, continuing the above example, in every loop of the video tour, the dynamic touring process 140-2 shows video from the devices that are in the fifth group, because of the vaults located on the fifth floor of the building. As part of the first loop, the dynamic touring process 140-2 shows video from only the third group, and not the seventh group, even though those two groups have the same (lower) display priority. On the next loop, the dynamic touring process 140-2 may show video from the seventh group, and not the third group, and so on.

In some embodiments, the dynamic touring process 140-2 may, for groups with a lower assigned display priority, use video from only a portion of the devices in that group, instead of all the devices in that group. Thus, if the third group of devices included fifty devices, in the first loop, the dynamic touring process 140-2 might show video from ten devices in the group, while in the second loop, the dynamic touring process 140-2 showed video from a different ten devices, and so on. The dynamic touring process 140-2 may, of course, determine portions of a group using any techniques described herein. For example, the dynamic touring process 140-2 may divide a group into portions based on geographic location, user input, present or past events, and so on.

Figure 6:
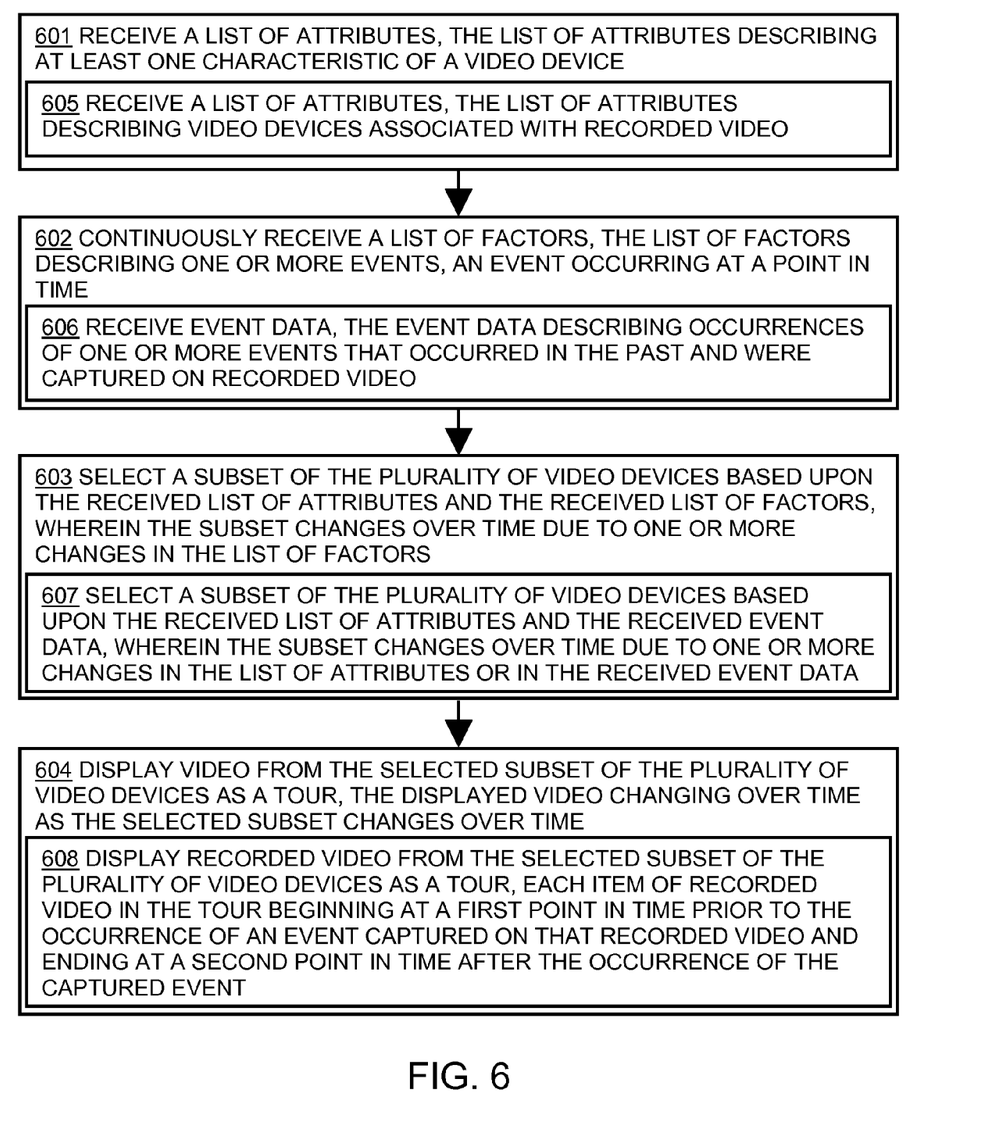
FIG. 6 illustrates a flowchart of a procedure performed by the system of FIG. 1 when creating a dynamic video tour to review recorded video of past events.

FIG. 6 illustrates an embodiment in which the dynamic touring process 140-2 allows a user to view, as a tour, recorded video of past events. For example, a security personnel supervisor may arrive at work in the morning and wish to see video related to events that happened the night before. Of course, each time the dynamic touring process 140-2 created such a review tour for a user, the tour would differ due to changes in times, events, and so on that happened in the past. The dynamic touring process 140-2 first receives a list of attributes, the list of attributes describing at least one characteristic of a video device, step 601. Here, the dynamic touring process 140-2 receives a list of attributes, the list of attributes describing video devices associated with recorded video, step 605. The video devices associated with recorded video may, in some embodiments, be NVRs that stored the recorded video of interest. The NVRs would be connected to the video devices that recorded the events in real time.

The dynamic touring process 140-2 next continuously receives a list of factors, the list of factors describing one or more events, an event occurring at a point in time, step 602. Here, for a review tour, the dynamic touring process 140-2 receives event data, the event data describing occurrences of one or more events that occurred in the past and were captured on recorded video, step 606. An event may be any occurrence as described herein according to event data. The dynamic touring process 140-2 has access to event data describing all the events of, for example, the past night or past week or whatever the review period is. Thus, for example, if during the previous night, a security person accidently tripped an alarm connected to a sensor, and a video device captured video of this, it would be an event, described in event data. The dynamic touring process 140-2 would receive this event data and be able to determine which video device, and thus which NVR, contained the video of the event. The dynamic touring process 140-2 would also know how long the event occurred in terms of which segments of the recorded video pertained to an event.

The dynamic touring process 140-2 selects a subset of the plurality of video devices based upon the received list of attributes and the received list of factors, step 603, where the subset changes over time due to one or more changes in the list of factors. Here, the dynamic touring process 140-2 selects, such as in the example above, a subset of the plurality of video devices based upon the received list of attributes and the received event data, wherein the subset changes over time due to one or more changes in the list of attributes or in the received event data. The dynamic touring process 140-2 selects as many NVRs as needed in order to show video of all the events that occurred during the review period. In some situations, of course, the dynamic touring process 140-2 may need to select only a single NVR, or may need two (or more) different segments of video from the same NVR.

Finally, the dynamic touring process 140-2 displays video from the selected subset of the plurality of video devices as a tour, the displayed video changing over time as the selected subset changes over time, step 604. More particularly here, the dynamic touring process 140-2 displays recorded video from the selected subset of the plurality of video devices as a tour, each item of recorded video in the tour beginning at a first point in time prior to the occurrence of an event captured on that recorded video and ending at a second point in time after the occurrence of the captured event. Thus, for example, as the dynamic touring process 140-2 played video from a selected NVR corresponding to an event, the dynamic touring process 140-2 would have the NVR start playback from some number of seconds before the event, and conclude playback for some number of seconds after the event occurred.

In some embodiments, the dynamic touring process 140-2 may interface with a virtual tracking application, such as is described in detail in co-pending U.S. patent application Ser. No. 12/125,122, entitled "TRACKING PEOPLE AND OBJECTS USING MULTIPLE LIVE AND RECORDED SURVEILLANCE CAMERA VIDEO FEEDS", the entirety of which is hereby incorporated by reference. The virtual tracking application may, while allowing a user to track a target of interest, store the video devices used during tracking, as well as the duration each device participated in tracking, in a log file. The dynamic touring process 140-2 may then receive the tracking log file from the virtual tracking application, and play it back as a dynamic video tour. In such a situation, the video would come from Network Video Recorders (NVRs) connected to the video devices as logged by the virtual tracking application.

The methods and systems described herein are not limited to a particular hardware or software configuration, and may find applicability in many computing or processing environments. The methods and systems may be implemented in hardware or software, or a combination of hardware and software. The methods and systems may be implemented in one or more computer programs, where a computer program may be understood to include one or more processor executable instructions. The computer program(s) may execute on one or more programmable processors, and may be stored on one or more storage medium readable by the processor (including volatile and non-volatile memory and/or storage elements), one or more input devices, and/or one or more output devices. The processor thus may access one or more input devices to obtain input data, and may access one or more output devices to communicate output data. The input and/or output devices may include one or more of the following: Random Access Memory (RAM), Redundant Array of Independent Disks (RAID), floppy drive, CD, DVD, magnetic disk, internal hard drive, external hard drive, memory stick, flash memory (i.e., solid state memory) device, or other storage device capable of being accessed by a processor as provided herein, where such aforementioned examples are not exhaustive, and are for illustration and not limitation.

The computer program(s) may be implemented using one or more high level procedural or object-oriented programming languages to communicate with a computer system; however, the program(s) may be implemented in assembly or machine language, if desired. The language may be compiled or interpreted.

As provided herein, the processor(s) may thus be embedded in one or more devices that may be operated independently or together in a networked environment, where the network may include, for example, a Local Area Network (LAN), wide area network (WAN), and/or may include an intranet and/or the internet and/or another network. The network(s) may be wired or wireless or a combination thereof and may use one or more communications protocols to facilitate communications between the different processors. The processors may be configured for distributed processing and may utilize, in some embodiments, a client-server model as needed. Accordingly, the methods and systems may utilize multiple processors and/or processor devices, and the processor instructions may be divided amongst such single- or multiple-processor/devices.

The device(s) or computer systems that integrate with the processor(s) may include, for example, a personal computer(s), workstation(s) (e.g., Sun, HP), personal digital assistant(s) (PDA(s)), handheld device(s) such as cellular telephone(s), laptop(s), handheld computer(s), or another device(s) capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the internet. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Those skilled in the art may make many additional changes in the details, materials, and arrangement of parts, herein described and illustrated.

What is claimed is:

1. A method of creating a dynamic video tour using video devices, the method comprising:
   receiving a list of attributes, the list of attributes describing attributes of the video devices;
   continuously receiving a list of factors, the list of factors including historical data specifying areas in which events have occurred in the past;
   utilizing the historical data in the list of factors as a basis to predict locations of future events that have not yet occurred;
   based on the predicted locations of the future events and the list of attributes describing attributes of the video devices, selecting a subset of the video devices from which to receive video capturing occurrence of the future events, the subset changes over time due to changes in the list of factors;
   displaying the video from the selected subset of the video devices as a tour, the displayed video changing over time as the selected subset changes over time;
   wherein displaying video comprises:
      dividing the selected subset of the video devices into a plurality of groups;
      assigning, to each group in the plurality of groups, a display priority, the display priority indicating how often video from video devices in that group should be displayed in the tour; and
      displaying loops of video in the tour, the video in a respective loop taken from video devices in groups associated with the respective loop, the groups associated with the respective loop determined according to the display priority assigned to those groups;
   the method further comprising:
      receiving a first list of factors including first historical data specifying geographical areas in which at least one event has occurred in the past;
      predicting occurrence of a first possible future event based on the received first list of factors;
      selecting a first subset of the video devices based upon the received list of attributes and the first list of factors, the received list of attributes indicating respective locations of the video devices;
      in the tour, initiating display of images captured by video devices in the first subset to display occurrence of the first possible future event;
      receiving a second list of factors including second historical data specifying geographical areas in which at least one event has occurred in the past;
      predicting occurrence of a second possible future event based on the received second list of factors;
      selecting a second subset of the video devices based upon the received list of attributes and the second list of factors;
      in the tour, initiating display of images captured by video devices in the second subset to display occurrence of the second possible future event.

2. The method of claim 1 wherein continuously receiving the list of factors comprises:
   receiving a first list of factors, the first list of factors describing a first set of events, an event in the first set of events occurring at a point in time;
   and wherein selecting comprises:
      selecting a subset of the video devices based upon the received list of attributes and the received first list of factors;
   and wherein the method comprises:
      receiving event data, the event data describing an occurrence of at least one event;
      creating a second list of factors based on the first list of factors and the received event data, the second list of factors describing a second set of events, the second set of events includes at least one event described by the received event data; and
      selecting a subset of the video devices based upon the received list of attributes and the created second list of factors.

3. The method of claim 2 wherein receiving event data comprises:
   receiving event data, the received event data describing an occurrence of one or more events; and
   assigning a weight to one or more items of received event data, an assigned weight corresponding to the event described by that item of received event data;
   and wherein selecting comprises:
      selecting a subset of the video devices based upon the received list of attributes and the created second list of factors, wherein weights assigned to events described by the second list of factors influence the selection of video devices included in the subset of the video devices.

4. The method of claim 1 comprising:
   prior to selecting, assigning a weight to at least one factor in the list of factors, an assigned weight corresponding to the event described by that factor;
   wherein selecting comprises:
      selecting a subset of the video devices based upon the received list of attributes and the received list of factors, wherein the subset changes over time due to changes in the list of factors, and wherein weights assigned to factors in the list of factors influence the selection of video devices included in the subset of the video devices.

5. The method of claim 1 wherein receiving a list of attributes comprises:

receiving a list of attributes, the list of attributes including one or more locations of a video device, a location describing an area of interest to be included in a tour;

and wherein selecting comprises:

selecting a subset of the video devices based upon the locations included in the received list of attributes and the received list of factors, wherein the subset changes over time due to one or more changes in the locations included in the list of attributes.

6. The method of claim 1 wherein receiving a list of attributes comprises:

receiving a list of attributes, the list of attributes describing video devices associated with recorded video;

and wherein continuously receiving a list of factors comprises:

receiving event data, the event data describing occurrences of one or more events that occurred in the past and were captured on recorded video;

and wherein selecting comprises:

selecting a subset of the video devices based upon the received list of attributes and the received event data, wherein the subset changes over time due to one or more changes in the list of attributes or in the received event data;

and wherein displaying comprises:

displaying recorded video from the selected subset of the video devices as a tour, each item of recorded video in the tour beginning at a first point in time prior to the occurrence of an event captured on that recorded video and ending at a second point in time after the occurrence of the captured event.

7. Computer-readable storage hardware having instructions stored thereon, the instructions, when carried out by a processor, causes the processor to perform operations of:

receiving a list of attributes, the list of attributes describing attributes of video devices;

continuously receiving a list of factors, the list of factors including historical data specifying areas in which events have occurred in the past;

utilizing the historical data in the list of factors as a basis to predict locations of future events that have not yet occurred;

based on the predicted locations of the future events and the list of attributes describing attributes of the video devices, selecting a subset of the video devices from which to receive video, the subset changes over time due to changes in the list of factors; and displaying the video from the selected subset of the video devices as a tour, the displayed video changing over time as the selected subset changes over time;

wherein displaying the video comprises: dividing the selected subset of the video devices into a plurality of groups, assigning, to each group in the plurality of groups, a display priority, the display priority indicating how often video from video devices in that group should be displayed in the tour, and displaying loops of video in the tour, the video in a respective loop taken from video devices in groups associated with the respective loop, the groups associated with the respective loop determined according to the display priority assigned to those groups;

receiving a first list of factors including first historical data specifying geographical areas in which at least one event has occurred in the past;

predicting occurrence of a first possible future event based on the received first list of factors;

selecting a first subset of the video devices based upon the received list of attributes and the first list of factors, the received list of attributes indicating respective locations of the video devices;

in the tour, initiating display of images captured by video devices in the first subset to display occurrence of the first possible future event;

receiving a second list of factors including second historical data specifying geographical areas in which at least one event has occurred in the past;

predicting occurrence of a second possible future event based on the received second list of factors;

selecting a second subset of the video devices based upon the received list of attributes and the second list of factors;

in the tour, initiating display of images captured by video devices in the second subset to display occurrence of the second possible future event.

8. A computer system comprising:

a memory;

a processor;

a network interface;

a display; and an interconnection mechanism coupling the memory, the processor, the display, and the network interface, allowing communication there between;

wherein the memory of the computer system is encoded with a dynamic touring application, that when executed in the processor, provides a dynamic touring process that intelligently crafts a dynamic video tour using a plurality of video devices selected in real time, by causing the computer system to perform operations of:

receiving a list of attributes, the list of attributes describing attributes of the video devices;

continuously receiving a list of factors, the list of factors including historical data specifying areas in which events have occurred in the past;

utilizing the historical data in the list of factors as a basis to predict locations of future events that have not yet occurred;

based on the predicted locations of the future events and the list of attributes describing attributes of the video devices, selecting a subset of the video devices from which to receive video, the subset changing over time due to changes in the list of factors; and displaying the video from the selected subset of the video devices as a tour, the displayed video changing over time as the selected subset changes over time;

wherein displaying the video comprises: dividing the selected subset of the video devices into a plurality of groups, assigning, to each group in the plurality of groups, a display priority, the display priority indicating how often video from video devices in that group should be displayed in the tour, and displaying loops of video in the tour, the video in a respective loop taken from video devices in groups associated with the respective loop, the groups associated with the respective loop determined according to the display priority assigned to those groups;

receiving a first list of factors including first historical data specifying geographical areas in which at least one event has occurred in the past;

predicting occurrence of a first possible future event based on the received first list of factors;

selecting a first subset of the video devices based upon the received list of attributes and the first list of factors, the received list of attributes indicating respective locations of the video devices;
in the tour, initiating display of images captured by video devices in the first subset to display occurrence of the first possible future event;
receiving a second list of factors including second historical data specifying geographical areas in which at least one event has occurred in the past;
predicting occurrence of a second possible future event based on the received second list of factors;
selecting a second subset of the video devices based upon the received list of attributes and the second list of factors;
in the tour, initiating display of images captured by video devices in the second subset to display occurrence of the second possible future event.

9. The computer system of claim 8 wherein continuously receiving a list of factors comprises:
receiving a first list of factors, the first list of factors describing a first set of events, an event in the first set of events occurring at a point in time;
and wherein selecting comprises:
selecting a subset of the plurality of video devices based upon the received list of attributes and the received first list of factors;
and wherein the computer system comprises:
receiving event data, the event data describing an occurrence of one or more events;
creating a second list of factors based on the first list of factors and the received event data, the second list of factors describing a second set of events, the second set of events includes one or more events described by the received event data; and
selecting a subset of the plurality of video devices based upon the received list of attributes and the created second list of factors.

10. The computer system of claim 9 wherein receiving event data comprises:
receiving event data, the event data describing an occurrence of one or more events; and
assigning a weight to one or more items of received event data, an assigned weight corresponding to the event described by that item of received event data;
and wherein selecting comprises:
selecting a subset of the plurality of video devices based upon the received list of attributes and the created second list of factors, wherein weights assigned to events described by the second list of factors influence the selection of video devices included in the subset of the plurality of video devices.

11. The computer system of claim 8 comprising:
prior to selecting, assigning a weight to one or more factors in the list of factors, an assigned weight corresponding to the event described by that factor;
wherein selecting comprises:
selecting a subset of the plurality of video devices based upon the received list of attributes and the received list of factors, wherein the subset changes over time due to one or more changes in the list of factors, and wherein weights assigned to factors in the list of factors influence the selection of video devices included in the subset of the plurality of video devices.

12. The computer system of claim 8 wherein receiving a list of attributes comprises:
receiving a list of attributes, the list of attributes including one or more locations of a video device, a location describing an area of interest to be included in a tour;
and wherein selecting comprises:
selecting a subset of the plurality of video devices based upon the locations included in the received list of attributes and the received list of factors, wherein the subset changes over time due to one or more changes in the locations included in the list of attributes.

13. The computer system of claim 8 wherein receiving a list of attributes comprises:
receiving a list of attributes, the list of attributes describing video devices associated with recorded video;
and wherein continuously receiving a list of factors comprises:
receiving event data, the event data describing occurrences of one or more events that occurred in the past and were captured on recorded video;
and wherein selecting comprises:
selecting a subset of the plurality of video devices based upon the received list of attributes and the received event data, wherein the subset changes over time due to one or more changes in the list of attributes or in the received event data;
and wherein displaying comprises:
displaying recorded video from the selected subset of the plurality of video devices as a tour, each item of recorded video in the tour beginning at a first point in time prior to the occurrence of an event captured on that recorded video and ending at a second point in time after the occurrence of the captured event.

14. The method as in claim 1 further comprising:
selecting the first subset of the video devices and the second subset of devices based upon dynamic weights assigned to the events.

15. The method as in claim 14, wherein displaying video comprises:
displaying the loops of video in the tour such that a group with a higher priority is always included in each of the loops, and a group with a lower priority is included in fewer loops than every one of the loops.

16. The method as in claim 14, wherein the list of factors indicates when and how long a respective event is to occur in the future.

17. The method as in claim 1 further comprising:
wherein selecting the subset of video devices includes dynamically selecting, over time and due to changes in the list of factors, different subsets of the video devices based upon the received list of attributes and the changes in the received list of factors; and
wherein displaying video includes displaying video from the different subsets of the video devices in the tour.

18. The method as in claim 17, wherein the list of attributes indicates locations of the video devices; and
wherein the list of factors indicates different events to be captured by the video devices.

19. The method as in claim 1, wherein the list of attributes indicates locations of the video devices in a geographical region; and
wherein the list of factors further indicates at least one future event that is scheduled to occur at a specified time.

20. The method as in claim 1, wherein the list of factors includes time-based data indicating scheduled events and when the scheduled events will occur;
assigning weight values to the scheduled events as specified by the list of factors; and selecting the subset based at least in part on the assigned weight values of the scheduled events.

21. The method as in claim 1, wherein the list of factors changes based on a time of day.

22. The method as in claim 1 further comprising:
adjusting weight values assigned to the video devices based on a history of events that previously occurred in a vicinity of the video devices; and
selecting the subset based at least in part on the weight values assigned to the video devices.

23. The method as in claim 1, wherein the future events are possible future events that are predicted to occur based on the historical data;
wherein the video captures occurrence of the possible future events; and
wherein displaying the video as a tour includes displaying the video of the possible future events after the possible future events occur.

24. The method as in claim 1 further comprising:
displaying the tour as a predictive tour, the video produced by the selected subset of the video devices capturing images of geographical areas where the future events are predicted to occur.

25. The method as in claim 24, wherein the future events are possible future events that are predicted to occur based on the historical data, the method further comprising:
displaying the tour to include images of the geographical areas where the future events are predicted to occur.

26. The computer system as in claim 8, wherein the computer system further performs operations of:
displaying the tour as a predictive tour, the video produced by the selected subset of the video devices capturing images of geographical areas where the future events are predicted to occur.

27. The computer system as in claim 26, wherein the future events are possible future events that are predicted to occur based on the historical data, the computer system further supporting operations of:
displaying the predictive tour to include images of the geographical areas where the future events are predicted to occur.

* * * * *